United States Patent
Shen et al.

(10) Patent No.: US 10,164,428 B2
(45) Date of Patent: Dec. 25, 2018

(54) VOLTAGE-SOURCE MULTI-LEVEL CONVERTER, DC POWER TRANSMISSION SYSTEM, AND FAULT PROCESSING METHOD AND DEVICE

(71) Applicants: NR ELECTRIC CO., LTD, Jiangsu (CN); NR ENGINEERING CO., LTD, Jiangsu (CN)

(72) Inventors: Guorong Shen, Jiangsu (CN); Jie Tian, Jiangsu (CN); Dongming Cao, Jiangsu (CN); Haiying Li, Jiangsu (CN); Yunlong Dong, Jiangsu (CN); Nannan Wang, Jiangsu (CN); Haibin Liu, Jiangsu (CN); Yu Lu, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 148 days.

(21) Appl. No.: 15/308,842

(22) PCT Filed: Feb. 5, 2015

(86) PCT No.: PCT/CN2015/072292
§ 371 (c)(1),
(2) Date: Nov. 4, 2016

(87) PCT Pub. No.: WO2015/169115
PCT Pub. Date: Nov. 12, 2015

(65) Prior Publication Data
US 2017/0070047 A1 Mar. 9, 2017

(30) Foreign Application Priority Data
May 9, 2014 (CN) .......................... 2014 1 0197048

(51) Int. Cl.
*H02J 1/00* (2006.01)
*H02J 3/36* (2006.01)
(Continued)

(52) U.S. Cl.
CPC ............... *H02J 1/00* (2013.01); *H02J 3/36* (2013.01); *H02M 1/32* (2013.01); *H02M 7/483* (2013.01); *H02M 2007/4835* (2013.01)

(58) Field of Classification Search
CPC .................................... H02J 3/00; H02J 1/00
(Continued)

(56) References Cited

U.S. PATENT DOCUMENTS

2009/0262477 A1* 10/2009 Dorn .................. H01H 85/0241
361/58
2011/0103116 A1* 5/2011 Asplund .................... H02J 3/36
363/131
(Continued)

FOREIGN PATENT DOCUMENTS

CN 102170110 8/2011
CN 102170140 8/2011
(Continued)

OTHER PUBLICATIONS

Zhang et al., "A Control and Protection Scheme of Multi-terminal DC Transmission System Based on MMC for DC Line Fault," Automation of Electric power systems, Aug. 10, 2013, pp. 140-145.
(Continued)

*Primary Examiner* — Rexford Barnie
*Assistant Examiner* — Joseph Inge
(74) *Attorney, Agent, or Firm* — JCIPRNET (57) ABSTRACT

The disclosure is related to a voltage-source multi-level converter including a phase unit. The phase unit includes first and second bridge arms, each includes modules and reactor connected in series. In the first bridge arm, a first
(Continued)

terminal of first reactor is connected to alternating-current terminal of the phrase unit, a second terminal thereof is connected to a first terminal of the first modules, and second terminal of the first modules is connected to first DC terminal of the phrase unit. In the second bridge arm, a first terminal of the second reactor is connected to the alternating-current terminal, a second terminal thereof is connected to a first terminal of the second modules, and a second terminal of the second modules is connected to second DC terminal of the phrase unit. Then, a parallel fault shunt circuit is connected between the second terminals of the first and second reactors.

14 Claims, 7 Drawing Sheets

(51) Int. Cl.
    *H02M 7/483*      (2007.01)
    *H02M 1/32*      (2007.01)

(58) Field of Classification Search
    USPC .......................................................... 307/113
    See application file for complete search history.

(56) References Cited

U.S. PATENT DOCUMENTS

| 2012/0026767 A1* | 2/2012 | Inoue | H02M 7/217 |
| | | | 363/89 |
| 2014/0002933 A1* | 1/2014 | Gao | H02M 1/32 |
| | | | 361/18 |

FOREIGN PATENT DOCUMENTS

| CN | 102931863 | | 2/2013 |
| CN | 102931863 A | * | 2/2013 |
| WO | 2012122825 | | 9/2012 |

OTHER PUBLICATIONS

"International Search Report (Form PCT/ISA/210)", dated Mar. 27, 2015, with English translation thereof, pp. 1-5.

* cited by examiner

VOLTAGE-SOURCE MULTI-LEVEL CONVERTER, DC POWER TRANSMISSION SYSTEM, AND FAULT PROCESSING METHOD AND DEVICE

BACKGROUND OF THE INVENTION

Field of the Invention

The present invention relates to converter technologies in the field of power electronics, and more particularly to a voltage-source multi-level converter, a direct-current (DC) power transmission system, and a fault processing method and device.

Description of Related Art

A voltage-source multi-level converter is a novel type of converter applicable to high voltage scenarios that attracts much concern in recent years, where sub-modules are cascaded, and states of the sub-modules are respectively controlled, such that an alternating-current (AC) voltage output by the converter may be approximate to a sine wave, thereby reducing the harmonic content of the output voltage. The voltage-source multi-level converter solves a voltage equalizing problem of series-connected parts of a voltage-source two-level converter.

With some voltage-source multi-level converters in the related art, when a DC line has a fault, an AC network may provide a fault current to a fault point, causing an over-current at a DC side. A method for solving the foregoing problem is to install a hybrid high-voltage direct-current (HVDC) circuit breaker at the DC side of the converter, so as to block a path for the AC network to provide the fault current to the fault point, thereby preventing the AC network from providing the fault current to the fault point when the DC line has the fault, and avoiding the over-current at the DC side.

However, a solution in the related art for solving the problem of an over-current at a DC side caused by providing a fault current to a fault point when a DC line has a fault in a voltage-source multi-level converter involves a complex implementation process and high costs. Therefore, how to use a simple and economical manner to solve the problem of an over-current at a DC side caused by providing a fault current to a fault point when a DC line has a fault in a voltage-source multi-level converter is of great significance.

SUMMARY OF THE INVENTION

Technical Problem

In view of the above, the embodiments of the present invention intend to provide a voltage-source multi-level converter, a DC power transmission system, and a fault processing method and device, so as to use a simple and economical manner to solve the problem of an over-current at a DC side caused by providing a fault current to a fault point when a DC line has a fault in a voltage-source multi-level converter.

Technical Solution

To achieve the foregoing objective, technical solutions of the embodiments of the present invention are implemented as follows:

The embodiments of the present invention provide a voltage-source multi-level converter, where the converter includes at least one phase unit; each phase unit includes a first bridge arm and a second bridge arm; a first terminal of the first bridge arm is taken as a first DC terminal of the phase unit; a first terminal of the second bridge arm is taken as a second DC terminal of the phase unit; and a second terminal of the first bridge arm and a second terminal of the second bridge arm are shorted together, as an AC terminal of the phase unit;

the first bridge arm includes at least two switchable first modules and one first reactor connected in series; a first terminal of the first reactor is connected to the AC terminal of the phase unit; a second terminal of the first reactor is connected to a first terminal of the at least two first modules connected in series; a second terminal of the at least two first modules connected in series is connected to the first DC terminal of the phase unit;

the second bridge arm includes at least two switchable second modules and one second reactor connected in series; a first terminal of the second reactor is connected to the AC terminal of the phase unit; a second terminal of the second reactor is connected to a first terminal of the at least two second modules connected in series; a second terminal of the at least two second modules connected in series is connected to the second DC terminal of the phase unit; and a parallel fault shunt circuit is connected between the second terminal of the first reactor and the second terminal of the second reactor.

The parallel fault shunt circuit includes one thyristor, the second terminal of the first reactor is connected to an anode of the thyristor, and the second terminal of the second reactor is connected to a cathode of the thyristor; or the parallel fault shunt circuit includes at least two thyristors connected in series, the second terminal of the first reactor is connected to an anode of the thyristors connected in series, and the second terminal of the second reactor is connected to a cathode of the thyristors connected in series.

The parallel fault shunt circuit further includes a lightning arrester, where when the parallel fault shunt circuit includes one thyristor, the lightning arrester and the thyristor are connected in parallel, and when the parallel fault shunt circuit includes at least two thyristors connected in series, the lightning arrester and the at least two thyristors connected in series are connected in parallel; and a first terminal of the lightning arrester is connected to the second terminal of the first reactor, and a second terminal of the lightning arrester is connected to the second terminal of the second reactor.

Each of the first modules and the second modules includes: a first turn-off semiconductor switch and a second turn-off semiconductor switch connected in series, a first diode connected in anti-parallel with the first turn-off semiconductor switch, a second diode connected in anti-parallel with the second turn-off semiconductor switch, and an energy storage element, where the energy storage element is connected in parallel with a series branch of the first turn-off semiconductor switch and the second turn-off semiconductor switch.

A negative terminal of the first turn-off semiconductor switch is connected to a positive terminal of the second turn-off semiconductor switch, a connection point thereof is taken as a second terminal of the first module, and a negative terminal of the second turn-off semiconductor switch is taken as a first terminal of the first module; or a positive terminal of the second turn-off semiconductor switch is taken as a second terminal of the first module, a negative terminal of the second turn-off semiconductor switch is connected to a positive terminal of the first turn-off semiconductor switch, and a connection point thereof is taken as a first terminal of the first module.

The energy storage element is a capacitor.

Each of the turn-off semiconductor switches is an Insulated Gate Bipolar Transistor (IGBT), an Injection Enhanced Gate Transistor (IEGT), an Integrated Gate Commutated Thyristor (IGCT), a Metal-Oxide-Semiconductor Field-Effect Transistor (MOSFET), or a Gate-Turn-Off Thyristor (GTO).

When the turn-off semiconductor switch is an IGBT or an IEGT, a positive terminal of the turn-off semiconductor switch is a collector of the IGBT or the IEGT, and a negative terminal of the turn-off semiconductor switch is an emitter of the IGBT or the IEGT;

when the turn-off semiconductor switch is an IGCT or a GTO, the positive terminal of the turn-off semiconductor switch is an anode of the IGCT or the GTO, and the negative terminal of the turn-off semiconductor switch is a cathode of the IGCT or the GTO; and when the turn-off semiconductor switch is an MOSFET, the positive terminal of the turn-off semiconductor switch is an emitter of the MOSFET, and the negative terminal of the turn-off semiconductor switch is a collector of the MOSFET.

The embodiments of the present invention further provide a DC power transmission system. The system includes at least one voltage-source multi-level converter of the embodiments of the present invention, where an AC terminal of a phase unit of each voltage-source multi-level converter is connected to an AC system through an AC side switch, and each of a first DC terminal and a second DC terminal of each voltage-source multi-level converter is connected to a DC line through a reactor and a DC side switch connected in series.

The embodiments of the present invention further provide a DC line fault processing method, which is applied to the DC power transmission system of the embodiments of the present invention, the method including:

blocking, when a fault of a DC line is detected, a converter in a DC power transmission system, instructing to switch off an AC side switch of the converter, and triggering a parallel fault shunt circuit in the converter after the AC side switch is switched off; and instructing to switch off a DC side switch when a fault current at a DC side is less than a set current value for switching off the DC side switch.

After switching off the DC side switch, the method further includes:

instructing, when a set arc-extinguishing time times out, to switch on the DC side switch of the converter, and instructing to switch on the AC side switch of the converter; and deblocking the converter, and recovering DC power.

The set current value for switching off the DC side switch is a value less than a value of an arc-breaking capability of the DC side switch.

The arc-extinguishing time is set according to a recovery time of dielectric strength of the DC line.

A value range of the arc-extinguishing time is 0.1 ms to 10 s.

The embodiments of the present invention further provide a fault processing device, which is applied to the DC power transmission system of the embodiments of the present invention, the device including:

a fault detection unit, configured to detect whether a DC line has a fault;

a fault processing unit, configured to block, when the fault detection unit detects that the DC line has a fault, a converter in a DC power transmission system, instruct to switch off an AC side switch, and trigger a parallel fault shunt circuit in the converter after the AC side switch is switched off; and a current detection unit, configured to detect a fault current at a DC side, and notify the fault processing unit when the fault current at the DC side is less than a set current value for switching off the DC side switch, where the fault processing unit is further configured to instruct, after obtaining the notification from the current detection unit, to switch off the DC side switch.

The fault processing unit is further configured to instruct, when a set arc-extinguishing time times out after the DC side switch is switched off, to switch on the DC side switch of the converter, and instruct to switch on the AC side switch of the converter; and deblock the converter and recover DC power.

Advantageous Effect

With the voltage-source multi-level converter, the DC power transmission system, and the fault processing method and device provided in the embodiments of the present invention, when a DC line has a fault, a thyristor in a parallel fault shunt circuit is triggered to share most current of a fault loop, so as to facilitate a DC side switch to disconnect the fault, thereby achieving restart of a flexible DC power transmission system and quickly recovering DC power.

DETAILED DESCRIPTION OF THE INVENTION

Technical solutions of the present invention are further described in detail below with reference to accompanying drawings and specific embodiments.

A voltage-source multi-level converter provided in the embodiments of the present invention includes at least one phase unit; each phase unit includes a first bridge arm and a second bridge arm; a first terminal of the first bridge arm is taken as a first DC terminal of the phase unit; a first terminal of the second bridge arm is taken as a second DC terminal of the phase unit; a second terminal of the first bridge arm and a second terminal of the second bridge arm are shorted together, as an AC terminal of the phase unit; and the first DC terminal and the second DC terminal are configured to access a DC network, and the AC terminal is configured to access an AC network.

The first bridge arm includes at least two switchable first modules and one first reactor connected in series; a first terminal of the first reactor is connected to the AC terminal of the phase unit; a second terminal of the first reactor is connected to a first terminal of the at least two first modules connected in series; a second terminal of the at least two first modules connected in series is connected to the first DC terminal of the phase unit.

The second bridge arm includes at least two switchable second modules and one second reactor connected in series; a first terminal of the second reactor is connected to the AC terminal of the phase unit; a second terminal of the second reactor is connected to a first terminal of the at least two second modules connected in series; a second terminal of the at least two second modules connected in series is connected to the second DC terminal of the phase unit.

A parallel fault shunt circuit is connected between the second terminal of the first reactor and the second terminal of the second reactor.

Preferably, the parallel fault shunt circuit in the embodiments of the present invention may include one thyristor, the second terminal of the first reactor is connected to an anode of the thyristor, and the second terminal of the second reactor is connected to a cathode of the thyristor; or the parallel fault shunt circuit may include at least two thyristors connected in series, the second terminal of the first reactor is connected to an anode of the thyristors connected in series, and the second terminal of the second reactor is connected to a cathode of the thyristors connected in series.

Preferably, the parallel fault shunt circuit in the embodiments of the present invention may further include a lightning arrester.

When the parallel fault shunt circuit includes one thyristor, the lightning arrester and the thyristor are connected in parallel, and when the parallel fault shunt circuit includes at least two thyristors connected in series, the lightning arrester and the at least two thyristors connected in series are connected in parallel.

A first terminal of the lightning arrester is connected to the second terminal of the first reactor, and a second terminal of the lightning arrester is connected to the second terminal of the second reactor.

Preferably, each of the first modules and the second modules in the embodiments of the present invention includes: a first turn-off semiconductor switch and a second turn-off semiconductor switch connected in series, a first diode connected in anti-parallel with the first turn-off semiconductor switch, a second diode connected in anti-parallel with the second turn-off semiconductor switch, and an energy storage element, where the energy storage element is connected in parallel with a series branch of the first turn-off semiconductor switch and the second turn-off semiconductor switch.

A negative terminal of the first turn-off semiconductor switch is connected to a positive terminal of the second turn-off semiconductor switch, a connection point thereof is taken as a second terminal of the first module, and a negative terminal of the second turn-off semiconductor switch is taken as a first terminal of the first module; or a positive terminal of the second turn-off semiconductor switch is taken as a second terminal of the first module, a negative terminal of the second turn-off semiconductor switch is connected to a positive terminal of the first turn-off semiconductor switch, and a connection point thereof is taken as a first terminal of the first module.

Preferably, the energy storage element may be a capacitor.

Each of the turn-off semiconductor switches may be an Insulated Gate Bipolar Transistor (IGBT), an Injection Enhanced Gate Transistor (IEGT), an Integrated Gate Commutated Thyristor (IGCT), a Metal-Oxide-Semiconductor Field-Effect Transistor (MOSFET), or a Gate-Turn-Off Thyristor (GTO).

When the turn-off semiconductor switch is an IGBT or an IEGT, a positive terminal of the turn-off semiconductor switch is a collector of the IGBT or the IEGT, and a negative terminal of the turn-off semiconductor switch is an emitter of the IGBT or the IEGT;

when the turn-off semiconductor switch is an IGCT or a GTO, the positive terminal of the turn-off semiconductor switch is an anode of the IGCT or the GTO, and the negative terminal of the turn-off semiconductor switch is a cathode of the IGCT or the GTO; and when the turn-off semiconductor switch is an MOSFET, the positive terminal of the turn-off semiconductor switch is an emitter of the MOSFET, and the negative terminal of the turn-off semiconductor switch is a collector of the MOSFET.

A structure of a phase unit of a voltage-source multi-level converter in the embodiments of the present invention is described in detail below with reference to specific accompanying drawings.

Figure 1:
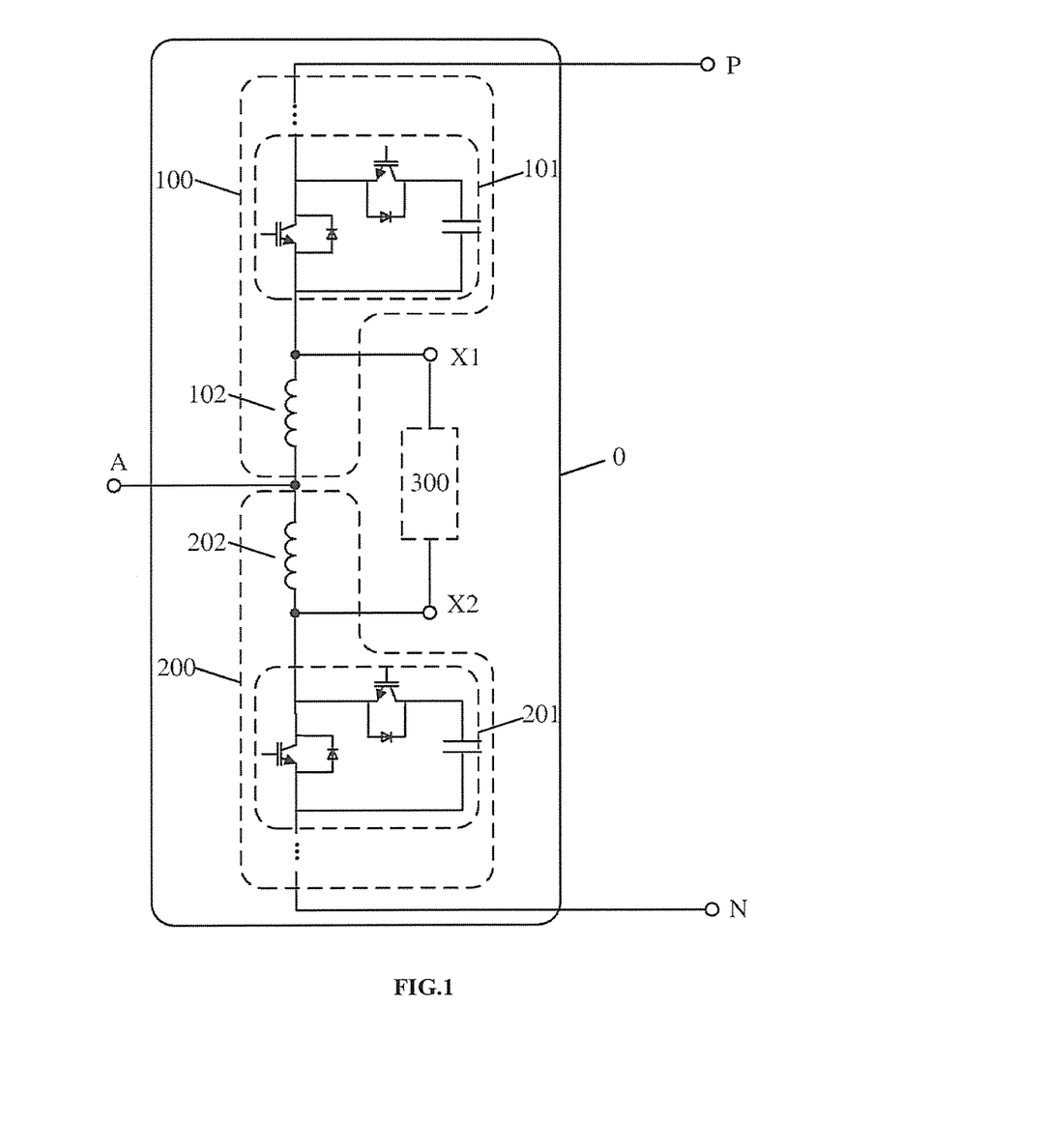
FIG. 1 is a schematic structural diagram of a phase unit of a voltage-source multi-level converter according to an embodiment of the present invention.

As shown in FIG. 1, FIG. 1 is a schematic structural diagram of a phase unit of a voltage-source multi-level converter according to an embodiment of the present invention. A phase unit 0 includes a first bridge arm 100 and a second bridge arm 200; a first terminal of the first bridge arm 100 is taken as a first DC terminal P of the phase unit; a first terminal of the second bridge arm 200 is taken as a second DC terminal N of the phase unit; the first DC terminal P and the second DC terminal N are respectively configured to access a DC network; a second terminal of the first bridge arm 100 and a second terminal of the second bridge arm 200 are shorted together, as an AC terminal A of the phase unit; and the AC terminal A is configured to access an AC network. The first bridge arm 100 includes at least two switchable first modules 101 and one first reactor 102 connected in series; a first terminal of the first reactor 102 is connected to the AC terminal A of the phase unit; a second terminal X1 of the first reactor 102 is connected to a first terminal of the at least two first modules 101 connected in series; a second terminal of the at least two first modules 101 connected in series is connected to the first DC terminal P of the phase unit. The second bridge arm 200 includes at least two switchable second modules 201 and one second reactor 202 connected in series; a first terminal of the second reactor 202 is connected to the AC terminal A of the phase unit; a second terminal X2 of the second reactor 202 is connected to a first terminal of the at least two second modules 201 connected in series; a second terminal of the at least two second modules 201 connected in series is connected to the second DC terminal N of the phase unit.

A parallel fault shunt circuit 300 is connected between the second terminal of the first reactor 102 and the second terminal of the second reactor 202.

Figure 2A:
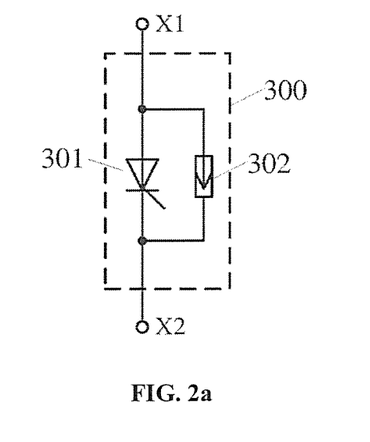
FIG. 2a is a schematic diagram of a parallel fault shunt circuit according to an embodiment of the present invention.

Preferably, as shown in FIG. 2a, a parallel fault shunt circuit in an embodiment of the present invention may be formed by a thyristor 301 and a lightning arrester 302 connected in parallel, an anode of the thyristor 301 is connected to the second terminal X1 of the first reactor 102, and a cathode of the thyristor 301 is connected to the second terminal X2 of the second reactor 202.

Figure 2B:
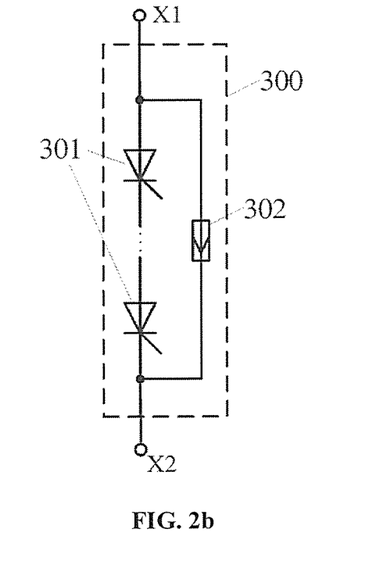
FIG. 2b is a schematic diagram of another parallel fault shunt circuit according to an embodiment of the present invention.

Further, as shown in FIG. 2b, another parallel fault shunt circuit in an embodiment of the present invention may be formed by at least two thyristors 301 connected in series and a lightning arrester 302, the thyristors 301 connected in series are is connected in parallel with the lightening arrester 302, an anode of the thyristors 301 connected in series is connected to the second terminal X1 of the first reactor 102, and a cathode of the thyristor 301 connected in series is connected to the second terminal X2 of the second reactor 202.

Figure 3A:
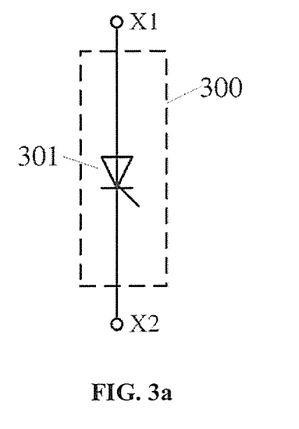
FIG. 3a is a schematic diagram of still another parallel fault shunt circuit according to an embodiment of the present invention.

Preferably, as shown in FIG. 3a, still another parallel fault shunt circuit in an embodiment of the present invention may be formed by a thyristor 301, an anode of the thyristor 301 is connected to the second terminal X1 of the first reactor 102, and a cathode of the thyristor 301 is connected to the second terminal X2 of the second reactor 202.

Figure 3B:
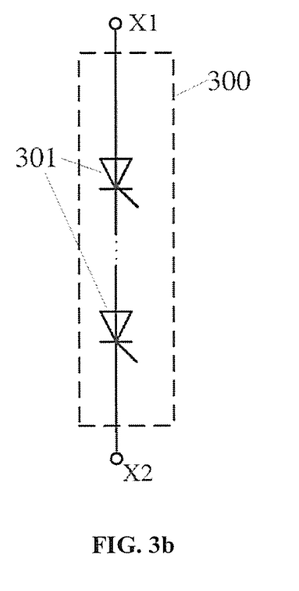
FIG. 3b is a schematic diagram of yet another parallel fault shunt circuit according to an embodiment of the present invention.

Further, as shown in FIG. 3b, yet another parallel fault shunt circuit in an embodiment of the present invention may be formed by at least two thyristors 301 connected in series, an anode of the thyristors 301 connected in series is connected to the second terminal X1 of the first reactor 102, and a cathode of the thyristors 301 connected in series is connected to the second terminal X2 of the second reactor 202.

That is, the structures of the parallel fault shunt circuits shown in FIG. 2a and FIG. 2b, as compared with the structures of the parallel fault shunt circuits shown in FIG. 3a and FIG. 3b, are respectively provided with the lightening arresters. The lightening arrester functions to protect a switching device, so as to prevent the device from being damaged by over-voltage.

Figure 4A:
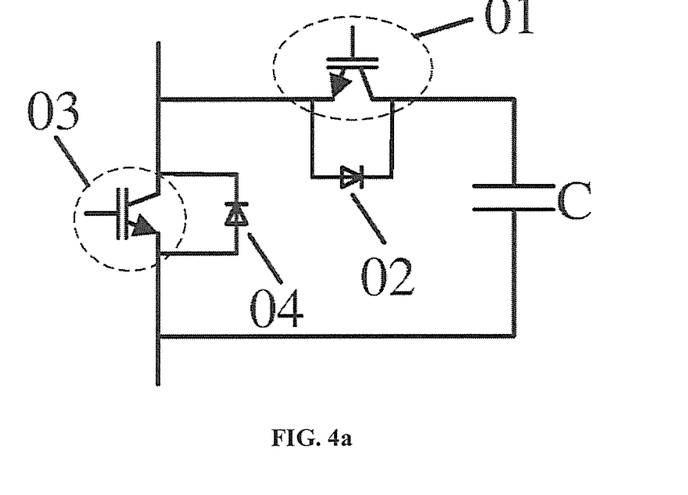
FIG. 4a is a schematic structural diagram of a first module or a second module according to an embodiment of the present invention.
Figure 4B:
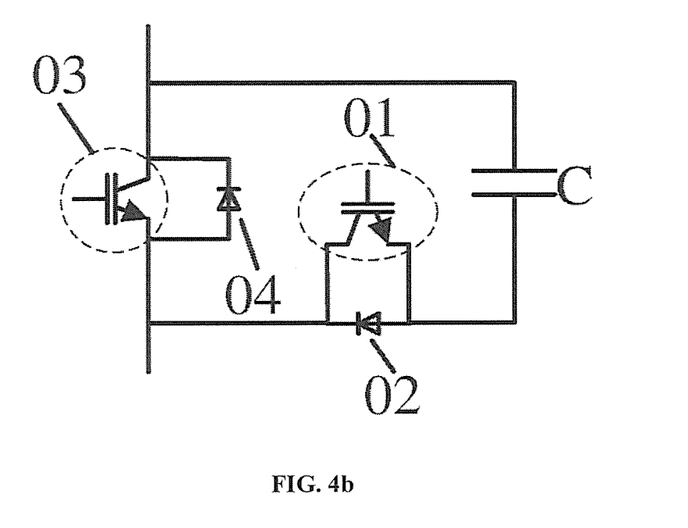
FIG. 4b is a schematic structural diagram of another first module or another second module according to an embodiment of the present invention.

FIG. 4a and FIG. 4b are two schematic structural diagrams of a first module or a second module according to an embodiment of the present invention. Each of the structures may include a turn-off semiconductor switch 01, a turn-off semiconductor switch 03, a diode 02, a diode 04, and an energy storage element C, where the turn-off semiconductor switch 01 is connected in anti-parallel with the diode 02, the turn-off semiconductor switch 03 is connected in anti-parallel with the diode 04; and each of the turn-off semiconductor switches 01, 03 may use a single controllable switching device (e.g. a full-controlled device such as an IGBT, an IGCT, an MOSFET, and a GTO, where an IGBI is used as an example below in this embodiment), or use a structure formed by at least two controllable switching devices connected in series. In the module shown in FIG. 4a, an emitter of the turn-off semiconductor switch 01 is connected to a collector of the turn-off semiconductor switch 03, a connection point thereof is taken as a second terminal of the module, a connector of the turn-off semiconductor switch 01 is connected to an emitter of the turn-off semiconductor switch 03 through the energy storage element C, and the emitter of the turn-off semiconductor switch 03 is taken as a first terminal of the module. In the module shown in FIG. 4b, an emitter of the turn-off semiconductor switch 03 is connected to a collector of the turn-off semiconductor switch 01, a connection point thereof is taken as a first terminal of the module, an emitter of the turn-off semiconductor switch 01 is connected to a collector of the turn-off semiconductor switch 03 through the energy storage element C, and the collector of the turn-off semiconductor switch 03 is taken as a second terminal of the module.

It should be noted that elements in the circuit structure shown in FIG. 1, such as reactor, resistor and energy storage element, mostly refer to equivalent elements. That is, each equivalent element in the circuit structure may be a single element, or may be formed by cascading (such as connecting in series or connecting in parallel) a plurality of identical elements. For example, the parallel fault shunt circuit may be formed by one thyristor, or may be formed by cascading at least two thyristors; and the reactor may be one reactor, or may be formed by cascading at least two reactors. Any equivalent elements in the embodiments of the present invention, and any equivalent circuits capable of achieving a same function shall fall within the protection scope of the embodiments of the present invention.

The embodiments of the present invention further provide a DC power transmission system formed by at least one voltage-source multi-level converter of the foregoing embodiment. In the system, an AC terminal of a phase unit of each voltage-source multi-level converter is connected to an AC system through an AC side switch, and each of a first DC terminal and a second DC terminal of each voltage-source multi-level converter is connected to a DC line through a reactor and a DC side switch connected in series.

Figure 5:
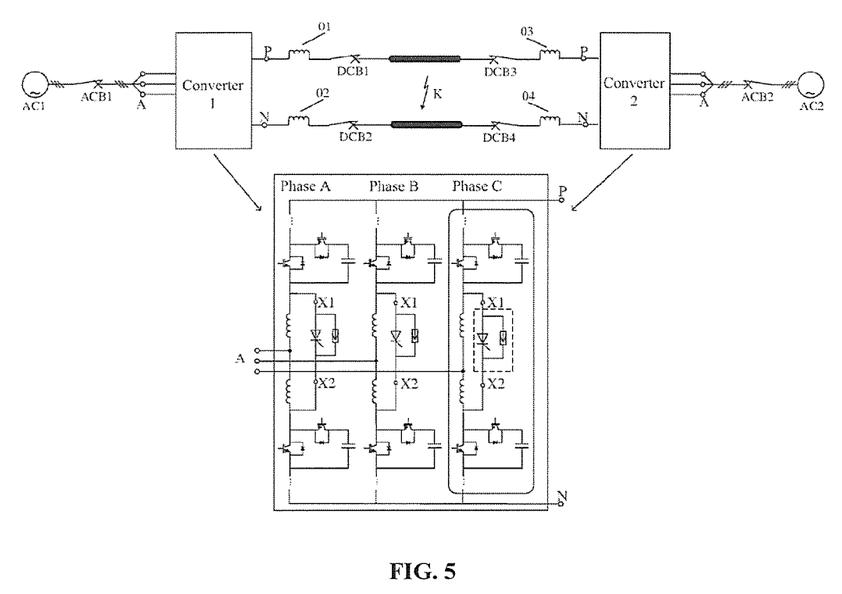
FIG. 5 is a schematic diagram of a topology of a two-terminal flexible DC power transmission system formed by a three-phase voltage-source multi-level converter according to an embodiment of the present invention.

FIG. 5 is a schematic diagram of a topology of a two-terminal flexible DC power transmission system formed by a three-phase voltage-source multi-level converter according to an embodiment of the present invention. In FIG. 5, each of a converter 1 and a converter 2 is formed by three phase units identical to the phase unit shown in FIG. 1. AC terminals A of the three phase units of the converter 1 are connected to an AC system AC1 through an AC side switch ACB1; a first DC terminal P of the converter 1 is connected to a first terminal of a DC side switch DCB1 through a reactor 01; a second DC terminal N of the converter 1 is connected to a first terminal of a DC side switch DCB2 through a reactor 02; a second terminal of the DC side switch DCB1 is connected to a first terminal of a first branch line; a second terminal of the DC side switch DCB2 is connected to a first terminal of a second branch line. AC terminals A of three phase units of the second converter 2 are connected to an AC system AC2 through an AC side switch ACB2; a first DC terminal P of the converter 2 is connected to a first terminal of a DC side switch DCB3 through a reactor 03; a second DC terminal N of the reactor 2 is connected to a first terminal of a DC side switch DCB4 through a reactor 04; a second terminal of the DC side switch DCB3 is connected to a second terminal of the first branch line; and a second terminal of the DC side switch DCB4 is connected to a second terminal of the second branch line.

The embodiments of the present invention further provide a DC line fault processing method applied to a DC power transmission system. The method mainly includes:

blocking, when a fault of a DC line is detected, a converter in a DC power transmission system, and instructing to switch off an AC side switch of the converter;

triggering a parallel fault shunt circuit in the converter after the AC side switch is switched off; and instructing to switch off a DC side switch when a fault current at a DC side is less than a set current value for switching off the DC side switch.

Preferably, after switching off the DC side switch, the method further includes:

instructing, when a set arc-extinguishing time times out, to switch on the DC side switch of the converter, and instructing to switch on the AC side switch of the converter; and deblocking the converter and recovering DC power.

Preferably, the set current value for switching off the DC side switch in the foregoing embodiment is a value less than a value of an arc-breaking capability of the DC side switch.

The arc-extinguishing time in the foregoing embodiment is set according to a recovery time of dielectric strength of the DC line. Preferably, a value range of the arc-extinguishing time is 0.1 ins to 10 s.

The DC line fault processing method in the foregoing embodiment of the present invention can be independently implemented in each converter of the DC power transmission system.

Figure 6:
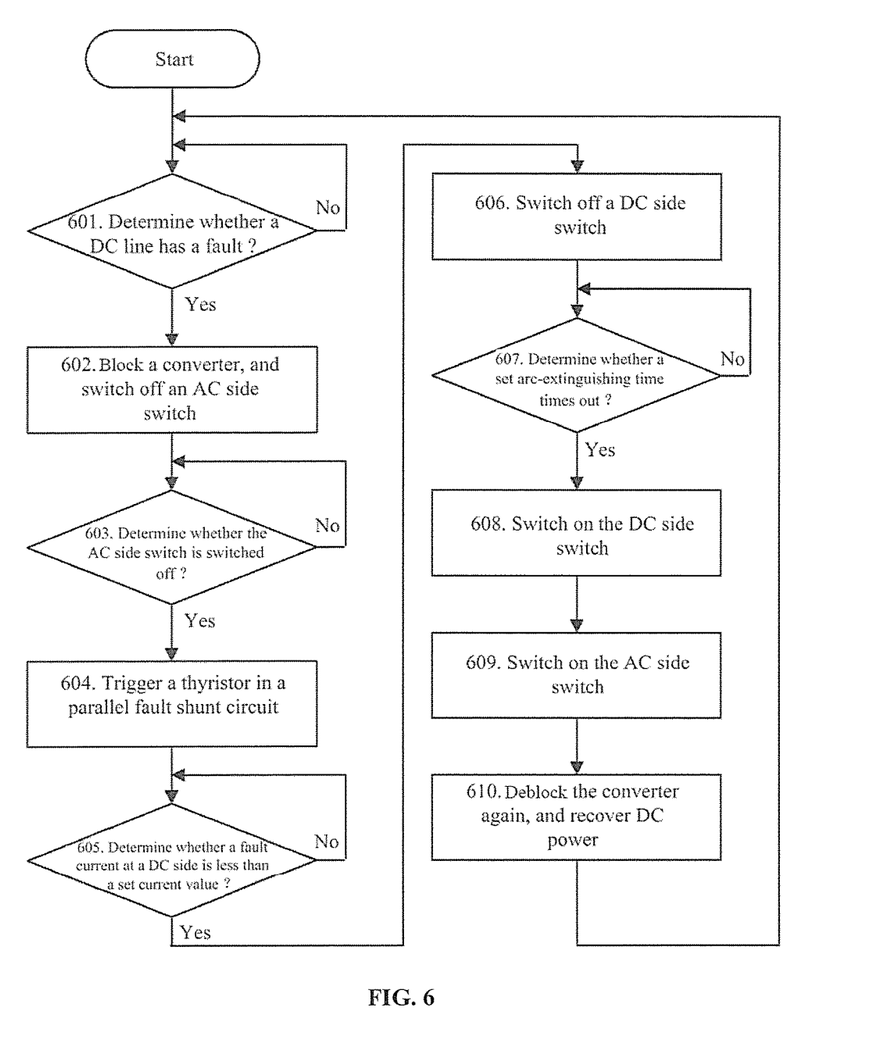
FIG. 6 is a flowchart of a DC line fault processing method according to an embodiment of the present invention.

The DC line fault processing method of the embodiments of the present invention is further described in detail below with reference to FIG. 6. As shown in FIG. 6, the DC line fault processing method mainly includes:

Step 601: Detect whether a DC line has a fault, and if yes, perform step 602; and otherwise, go back to continue the detection;

Step 602: Block a converter immediately, send a command for switching off an AC side switch of the converter, and instruct to switch off the AC side switch of the converter, and go to step 603;

Step 603: Determine whether the AC side switch is switched off, and if yes, perform step 504; and otherwise, go back to continue the determination;

Step 604: Trigger a thyristor in a parallel fault shunt circuit immediately after the AC side switch is switched off, and go to step 605;

Step 605: Determine whether a fault current at a DC side is decreased to be less than a set current value for switching off the DC side switch, and if yes, perform step 606; and otherwise, go back to continue the determination;

Step 606: Instruct to switch off the DC side switch when the fault current at the DC side is decreased to be less than the set current value for switching off the DC side switch, and go to step 607, where the set current value for switching off the DC side switch is a value less than a value of an arc-breaking capability of the DC side switch;

Step 607: Determine whether a set arc-extinguishing time times out, and if yes, perform step 608; and otherwise, go back to continue the determination, where the arc-extinguishing time may be set according to a recovery time of dielectric strength of the DC line, and a preferable value range is 0.1 ms to 10 s;

Step 608: Instruct to switch on the DC side switch of the converter, and go to step 609;

Step 609: Instruct to switch on the AC side switch of the converter, and go to step 610; and Step 610: Deblock the converter, and recover DC power.

The DC line fault processing method of the embodiments of the present invention is further described in detail below with reference to the DC power transmission system shown in FIG. 5.

The set current value for switching off the DC side switch is 1000 A, and the arc-extinguishing time is 100 ins. When a point K at the DC line of the flexible DC power transmission system shown in FIG. 5 is short circuited, both protection devices of the converter 1 and the converter 2 in the flexible DC power transmission system detect that the DC line has a fault, subsequently block the converter 1 and the converter 2 immediately, synchronously send commands for switching off the AC side incoming switches of the converters, immediately trigger the thyristors in the parallel fault shunt circuits in the converter 1 and the converter 2 after the AC side switches are switched off, switch off the DC side switches when the fault current at the DC side is decreased to be less than 1000 A, sequentially switch on the DC side switches and the AC side switches of the converters 1, 2 after a delay of the arc-extinguishing time of 100 ms, and deblock the converters 1, 2 and recover the DC power.

Figure 7:
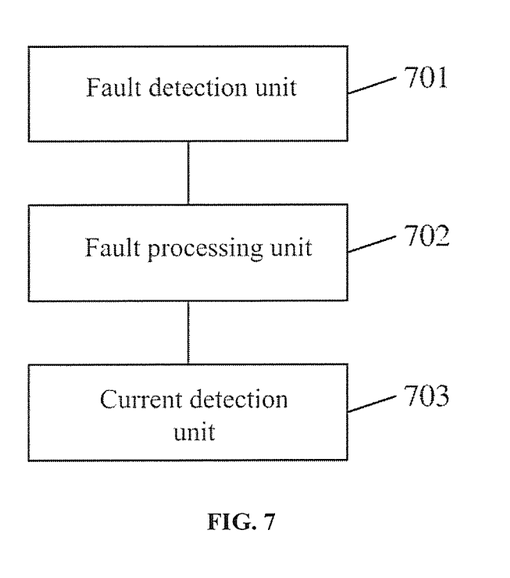
FIG. 7 is a schematic structural diagram a DC line fault processing device according to an embodiment of the present invention.

The embodiments of the present invention further provide a DC line fault processing device corresponding to the DC line processing method of the embodiments of the present invention. The device is applied to the DC power transmission system of the embodiments of the present invention, as shown in FIG. 7, the device including:

a fault detection unit 701, configured to detect whether a DC line has a fault;

a fault processing unit 702, configured to block, when the fault detection unit 701 detects that the DC line has a fault, a converter in a DC power transmission system, instruct to switch off an AC side switch of the converter, and trigger a parallel fault shunt circuit in the converter after the AC side switch is switched off; and a current detection unit 703, configured to detect a fault current at a DC side, and notify the fault processing unit 702 when the fault current at the DC side is less than a set current value for switching off a DC side switch, where the fault processing unit 702 is further configured to instruct, after obtaining the notification from the current detection unit 703, to switch off the DC side switch.

Preferably, the fault processing unit 703 is further configured to instruct, when a set arc-extinguishing time times out after the DC side switch is switched off, to switch on the DC side switch of the converter, and instruct to switch on the AC side switch of the converter; and deblock the converter and recover DC power.

It should be noted that the DC line fault processing device in the embodiments of the present invention may be disposed inside the structure of a converter, or be disposed outside the structure of a converter; and a DC line fault processing device may be individually disposed for each converter in a DC power transmission system, or a unified DC line fault processing device is disposed for all the converters in a DC power transmission system.

The embodiments of the present invention bring out at least the following technical effects:

1. with the voltage-source multi-level converter provided in the embodiments of the present invention, when a DC line has a fault, a bypass thyristor in a parallel fault shunt circuit is triggered to share most current of a fault loop, so as to facilitate a DC side switch to disconnect the fault;

2. with the voltage-source multi-level converter provided in the embodiments of the present invention, in a process of switching on and switching off the DC side switch, a severe over-voltage problem is avoided due to the existence of a bypass thyristor loop;

3. the parallel fault shunt circuit in the voltage-source multi-level converter provided in the embodiments of the present invention allows easy implementation and low costs;

4. with the DC line fault processing method provided in the embodiments of the present invention, by means of an appropriate restart control timing, restart of a flexible DC power transmission system and quick recovery of DC power can be achieved when the DC line has a transient fault; and 5. the DC line fault processing method provided in the embodiments of the present invention allows an easy and reliable operation process and easy implementation.

The foregoing descriptions are merely preferred embodiments of the present invention, and are not intended to limit the protection scope of the present invention.

What is claimed is:

1. A voltage-source multi-level converter, comprising:
at least one phase unit; wherein each phase unit comprises a first bridge arm and a second bridge arm; a first terminal of the first bridge arm is taken as a first DC terminal of the phase unit; a first terminal of the second bridge arm is taken as a second DC terminal of the phase unit; and a second terminal of the first bridge arm and a second terminal of the second bridge arm are shorted together, as an AC terminal of the phase unit;
wherein the first bridge arm comprises at least two switchable first modules and one first reactor connected in series; a first terminal of the first reactor is connected to the AC terminal of the phase unit; a second terminal of the first reactor is connected to a first terminal of the at least two first modules connected in series; and a second terminal of the at least two first modules connected in series is connected to the first DC terminal of the phase unit;
wherein the second bridge arm comprises at least two switchable second modules and one second reactor connected in series; a first terminal of the second reactor is connected to the AC terminal of the phase unit; a second terminal of the second reactor is connected to a first terminal of the at least two second modules connected in series; a second terminal of the at least two second modules connected in series is connected to the second DC terminal of the phase unit; and
a parallel fault shunt circuit connected between the second terminal of the first reactor and the second terminal of the second reactor;
wherein the parallel fault shunt circuit is triggered after an AC side switch in the converter is switched off, and sharing the current of a fault loop, so as to accelerate a DC side switch to disconnect the fault;
wherein each of the switchable first modules and the switchable second modules comprises: a first turn-off semiconductor switch and a second turn-off semiconductor switch connected in series, a first diode connected in anti-parallel with the first turn-off semiconductor switch, a second diode connected in anti-parallel with the second turn-off semiconductor switch, and an energy storage element, wherein the energy storage element is connected in parallel with a series branch of the first turn-off semiconductor switch and the second turn-off semiconductor switch; and
wherein a negative terminal of the first turn-off semiconductor switch is connected to a positive terminal of the second turn-off semiconductor switch, a connection point thereof is taken as a second terminal of the first module, and a negative terminal of the second turn-off semiconductor switch is taken as a first terminal of the first module; or a positive terminal of the second turn-off semiconductor switch is taken as a second terminal of the first module, a negative terminal of the second turn-off semiconductor switch is connected to a positive terminal of the first turn-off semiconductor switch, and a connection point thereof is taken as a first terminal of the first module.

2. The voltage-source multi-level converter according to claim 1, wherein
the parallel fault shunt circuit comprises one thyristor, the second terminal of the first reactor is connected to an anode of the thyristor, and the second terminal of the second reactor is connected to a cathode of the thyristor; or the parallel fault shunt circuit comprises at least two thyristors connected in series, the second terminal of the first reactor is connected to an anode of the thyristors connected in series, and the second terminal of the second reactor is connected to a cathode of the thyristors connected in series.

3. The voltage-source multi-level converter according to claim 2, wherein the parallel fault shunt circuit further comprises a lightening arrester;
when the parallel fault shunt circuit comprises one thyristor, the lightning arrester and the thyristor are connected in parallel, and when the parallel fault shunt circuit comprises at least two thyristors connected in series, the lightning arrester and the at least two thyristors connected in series are connected in parallel; and
a first terminal of the lightning arrester is connected to the second terminal of the first reactor, and a second terminal of the lightning arrester is connected to the second terminal of the second reactor.

4. The voltage-source multi-level converter according to claim 1, wherein the energy storage element is a capacitor.

5. The voltage-source multi-level converter according to claim 1, wherein each of the turn-off semiconductor switches is an Insulated Gate Bipolar Transistor (IGBT), an Injection Enhanced Gate Transistor (IEGT), an Integrated Gate Commutated Thyristor (IGCT), a Metal-Oxide-Semiconductor Field-Effect Transistor (MOSFET), or a Gate-Turn-Off Thyristor (GTO).

6. The voltage-source multi-level converter according to claim 5, wherein when the turn-off semiconductor switch is an IGBT or an IEGT, a positive terminal of the turn-off semiconductor switch is a collector of the IGBT or the IEGT, and a negative terminal of the turn-off semiconductor switch is an emitter of the IGBT or the IEGT;
when the turn-off semiconductor switch is an IGCT or a GTO, the positive terminal of the turn-off semiconductor switch is an anode of the IGCT or the GTO, and the negative terminal of the turn-off semiconductor switch is a cathode of the IGCT or the GTO; and
when the turn-off semiconductor switch is an MOSFET, the positive terminal of the turn-off semiconductor switch is an emitter of the MOSFET, and the negative terminal of the turn-off semiconductor switch is a collector of the MOSFET.

7. A DC power transmission system, characterized in that the system comprises at least one voltage-source multi-level converter according to claim 1, wherein an AC terminal of a phase unit of each voltage-source multi-level converter is connected to an AC system through an AC side switch, and each of a first DC terminal and a second DC terminal of each voltage-source multi-level converter is connected to a DC line through a reactor and a DC side switch connected in series.

8. A DC line fault processing method, which is applied to the DC power transmission system according to claim 7, the method comprising:
blocking, when a fault of a DC line is detected, a converter in a DC power transmission system, and instructing to switch off an AC side switch of the converter;
triggering a parallel fault shunt circuit in the converter after the AC side switch is switched off; and
instructing to switch off a DC side switch when a fault current at a DC side is less than a set current value for switching off the DC side switch.

9. The DC line fault processing method according to claim 8, wherein after switching off the DC side switch, the method further comprises:

instructing, when a set arc-extinguishing time times out, to switch on the DC side switch of the converter, and instructing to switch on the AC side switch of the converter; and deblocking the converter, and recovering DC power.

10. The DC line fault processing method according to claim 9, wherein the set current value for switching off the DC side switch is a value less than a value of an arc-breaking capability of the DC side switch.

11. The DC line fault processing method according to claim 9, wherein the arc-extinguishing time is set according to a recovery time of dielectric strength of the DC line.

12. The DC line fault processing method according to claim 11, wherein a value range of the arc-extinguishing time is 0.1 ms to 10 s.

13. A fault processing device, which is applied to the DC power transmission system according to claim 7, the device comprising:

a fault detection unit, configured to detect whether a DC line has a fault;

a fault processing unit, configured to block, when the fault detection unit detects that the DC line has a fault, a converter in a DC power transmission system, instruct to switch off an AC side switch, and trigger a parallel fault shunt circuit in the converter after the AC side switch is switched off; and a current detection unit, configured to detect a fault current at a DC side, and notify the fault processing unit when the fault current at the DC side is less than a set current value for switching off the DC side switch, wherein the fault processing unit is further configured to instruct, after obtaining the notification from the current detection unit, to switch off the DC side switch.

14. The fault processing device according to claim 13, wherein the fault processing unit is further configured to instruct, when a set arc-extinguishing time times out after the DC side switch is switched off, to switch on the DC side switch of the converter, and instruct to switch on the AC side switch of the converter; and deblock the converter and recover DC power.

* * * * *